United States Patent
Yamabe et al.

(10) Patent No.: US 7,799,728 B2
(45) Date of Patent: Sep. 21, 2010

(54) PHOTOCATALYST DISPERSING ELEMENT, METHOD FOR MANUFACTURING PHOTOCATALYST DISPERSING ELEMENT, PHOTOCATALYST ELEMENT, METHOD FOR MANUFACTURING PHOTOCATALYST ELEMENT

(75) Inventors: Junsei Yamabe, Kanagawa-ken (JP); Naoaki Sakurai, Kanagawa-ken (JP); Nobuaki Makino, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/410,559

(22) Filed: Mar. 25, 2009

(65) Prior Publication Data

US 2009/0253575 A1    Oct. 8, 2009

(30) Foreign Application Priority Data

Mar. 31, 2008    (JP)    ............................. 2008-092497

(51) Int. Cl.
*B01J 23/00*    (2006.01)
(52) U.S. Cl. ...................................... 502/305; 502/254
(58) Field of Classification Search ................. 502/305, 502/254
See application file for complete search history.

(56) References Cited

U.S. PATENT DOCUMENTS

| 6,906,001 | B1 * | 6/2005 | Escaffre et al. | ............. | 502/242 |
| 7,582,156 | B2 * | 9/2009 | Tanaka et al. | .......... | 106/287.19 |
| 2005/0139110 | A1 * | 6/2005 | Suda et al. | .................. | 101/478 |
| 2008/0241542 | A1 * | 10/2008 | Ohtani et al. | ............... | 428/403 |

FOREIGN PATENT DOCUMENTS

| JP | 11-1620 | 1/1999 |
| JP | 2002-212464 | 7/2002 |

* cited by examiner

*Primary Examiner*—Timothy C Vanoy
*Assistant Examiner*—Michelle Hou
(74) *Attorney, Agent, or Firm*—Oblon, Spivak, McClelland, Maier & Neustadt, L.L.P.

(57) ABSTRACT

A photocatalyst dispersing element includes: a photocatalyst material; and a solvent. A hydrogen-ion exponent of the solvent is in a range of pH 2.1 or more and pH 5.7 or less. A method for manufacturing a photocatalyst dispersing element includes: adjusting a hydrogen-ion exponent in a solvent to be in a range of inhibiting aggregation of a photocatalyst material and of suppressing lowering of a degree of catalytic activity of the photocatalyst material; and mixing the photocatalyst material with the solvent.

6 Claims, 2 Drawing Sheets

PHOTOCATALYST DISPERSING ELEMENT, METHOD FOR MANUFACTURING PHOTOCATALYST DISPERSING ELEMENT, PHOTOCATALYST ELEMENT, METHOD FOR MANUFACTURING PHOTOCATALYST ELEMENT

CROSS-REFERENCE TO RELATED APPLICATIONS

This application is based upon and claims the benefit of priority from the prior Japanese Patent Application No. 2008-092497, filed on Mar. 31, 2008; the entire contents of which are incorporated herein by reference.

BACKGROUND OF THE INVENTION

1. Field of the Invention

This invention relates to a photocatalyst dispersing element, a method for manufacturing a photocatalyst dispersing element, a photocatalyst element, and a method for manufacturing a photocatalyst element.

2. Background Art

In recent years, a photocatalyst material as represented by titanium dioxide has gathered attention. "Photocatalyst material" is a substance that has a semiconductor-like physical property, enters into an excited state by being irradiated with light having larger energy than the band gap energy between the conduction band and the valence band and generates a pair of electron and hole.

Titanium dioxide is photoexcited by being irradiated with light having a wavelength of 387 nm or less and a pair of electron and hole is generated inside. Thereby, the pair of electron and hole generates reactive oxygen species such as hydroxyl group radical or superoxide ion on the surface of the photocatalyst material and in the vicinity thereof, and then the oxidative active oxygen species cause degradation activity or hydrophilization. And, utilization of these actions can generate self-cleaning action, deodorization action, antibacterial action, and so forth, and therefore, various members and product groups provided with the photocatalyst materials have been proposed.

Moreover, in the case of titanium dioxide that is a representative photocatalyst material, its main excitation light is ultraviolet, and thereby, there is a problem that sufficient performance cannot be obtained in a room with little ultraviolet. Therefore, the photocatalyst material of so-called visible light response type is being investigated, and there are tungsten oxide and cadmium sulfide as the representative substances.

In using such a photocatalyst material for various materials or product groups or the like, it is necessary to provide the photocatalyst material on the surface of a substrate. In this case, it is convenient that the liquid or the like containing the photocatalyst material is preliminarily produced and applied to the surface of the substrate.

Therefore, a liquid or cream containing the photocatalyst material has been proposed (see, JP-A 11-1620 (Kokai) (1999), JP-A 2002-212464 (Kokai)). However, in these techniques, dispersibility of the photocatalyst material in the association with the degree of catalytic activity of the photocatalyst material has not been considered. Therefore, it is feared that the photocatalyst materials aggregates one another and that the dispersion becomes nonuniform. Also, it is feared that the degree of catalytic activity of the photocatalyst material lowers.

SUMMARY OF THE INVENTION

According to an aspect of the invention, there is provided a photocatalyst dispersing element including: a photocatalyst material; and a solvent, a hydrogen-ion exponent of the solvent being in a range of pH 2.1 or more and pH 5.7 or less.

According to another aspect of the invention, there is provided a method for manufacturing a photocatalyst dispersing element, including: adjusting a hydrogen-ion exponent in a solvent to be in a range of inhibiting aggregation of a photocatalyst material and of suppressing lowering of a degree of catalytic activity of the photocatalyst material; and mixing the photocatalyst material with the solvent.

According to another aspect of the invention, there is provided a method for manufacturing a photocatalyst dispersing element, including: mixing a photocatalyst material with a solvent; and adjusting a hydrogen-ion exponent in the solvent to be in a range of inhibiting aggregation of the photocatalyst material and of suppressing lowering of a degree of catalytic activity of the photocatalyst material.

According to another aspect of the invention, there is provided a photocatalyst element including: a substrate; and a photocatalyst provided on the substrate and formed by attaching a photocatalyst dispersing element to a surface of the substrate and drying the photocatalyst dispersing element, the photocatalyst dispersing element including: a photocatalyst material; and a solvent, a hydrogen-ion exponent of the solvent being in a range of pH 2.1 or more and pH 5.7 or less.

According to another aspect of the invention, there is provided a method for manufacturing a photocatalyst element, including: attaching a photocatalyst dispersing element to a surface of a substrate, the photocatalyst dispersing element including: a photocatalyst material; and a solvent, a hydrogen-ion exponent of the solvent being in a range of pH 2.1 or more and pH 5.7 or less.

DETAILED DESCRIPTION OF THE INVENTION

Figure 1:
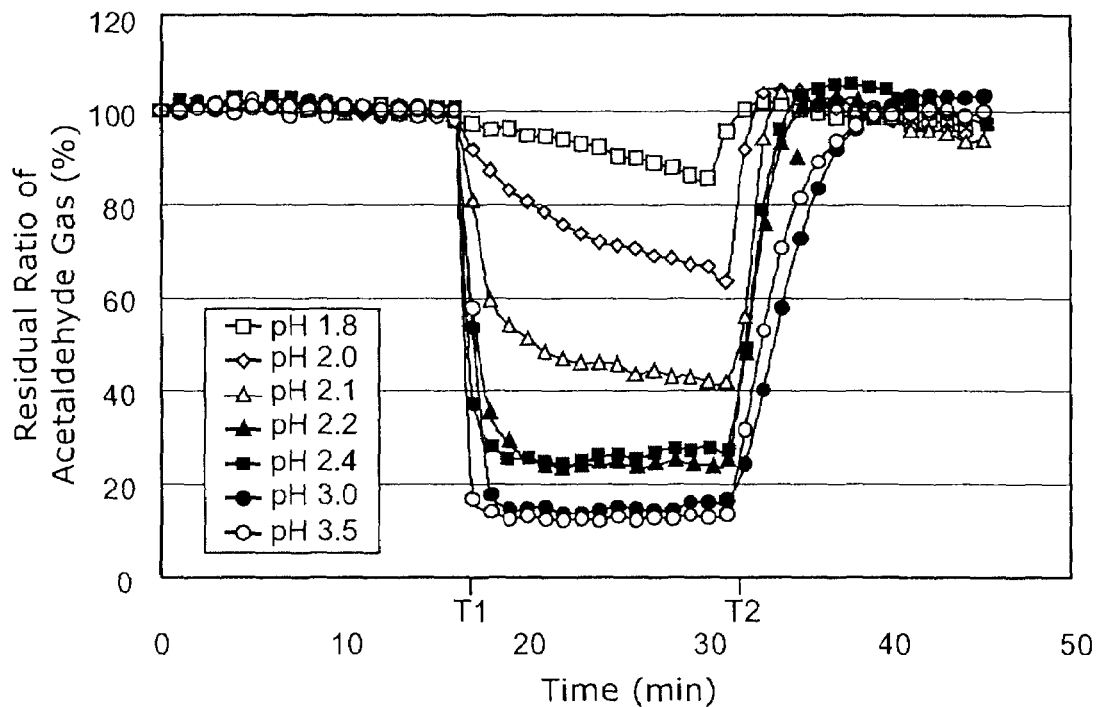
FIG. 1 shows a graph for illustrating degradation characteristics of an acetaldehyde gas.

Hereinafter, an embodiment of the invention will be exemplified.

In this embodiment, the photocatalyst dispersing element in which at least the photocatalyst material is dispersed in a fluent substance as a solvent is used, but the fluent substance includes a gel-like substance.

In general, in the particles of metal oxide, the surface thereof is replaced by hydroxyl groups (—OH), and absolute value of a zeta potential becomes large and the dispersibility is improved. Therefore, when dispersion of the photocatalyst material in an alkali aqueous solution is used as the photocatalyst dispersing element, aggregation of the photocatalyst materials can be suppressed and the uniformity of the dispersion can be improved.

However, if the alkali concentration is set to be too high (namely, the hydrogen-ion exponent is set to be too high), metal oxide occasionally becomes molecules or ions to solve into an aqueous solution (here, the metal oxide occasionally becomes a complex with hydroxyl groups (—OH) to solve in an aqueous solution as molecules). In particular, in the case of the photocatalyst material, if the hydrogen-ion exponent is set to be too high, the amount of replacement by hydroxyl groups (—OH) becomes too large, and it is also feared that its degree of activity as the photocatalyst material comes to lower.

Therefore, when the photocatalyst dispersing element is produced by dispersing the photocatalyst material in the fluent substance as the solvent, it is preferable that a lower limit value of the hydrogen-ion exponent is determined from the view point of dispersibility and that a upper limit value of the hydrogen-ion exponent is determined from the view point of suppressing lowering of the catalyst activation level. That is, it is preferable that the photocatalyst dispersing element includes the photocatalyst material and the fluent substance as the solvent and that the hydrogen-ion exponent of the fluent substance as the solvent is in the range of inhibiting aggregation of the photocatalyst material and suppressing lowering of the degree of catalytic activity of the photocatalyst.

Here, the photocatalyst easily solving in an alkali aqueous solution can include tungsten oxide. Therefore, hereinafter in this embodiment, as one example, the case that tungsten oxide is used as the photocatalyst material and dispersed in the fluent substance as the solvent will be described.

In general, the oxide called as tungsten oxide is tungsten trioxide ($WO_3$) and is metal oxide that is extremely stable in air. Moreover, the tungsten oxide has a band gap of 2.5 eV, and visible light to 480 nm can be utilized, and therefore, the tungsten is useful as the photocatalyst material used for indoor application. Moreover, the tungsten oxide can be relatively easily obtained as the industrial material and is a relatively inexpensive material having little harmful effect.

In order to produce the photocatalyst dispersing element by dispersing such tungsten oxide in the fluent substance as the solvent, first, the lower limit value of the hydrogen-ion exponent can be determined from the viewpoint of dispersibility.

According to knowledge obtained by the present inventors, it has been found that when the additive amount of the tungsten oxide is illustratively 2.5 wt %, if the hydrogen-ion exponent of the fluent substance as the solvent in which the tungsten oxide is dispersed is set to be less than pH 2.1, the dispersibility degrades. In this case, it has also been confirmed that the particles of tungsten oxide aggregate one another.

Moreover, from the viewpoint of suppressing lowering of the catalytic activity, the upper limit value of the hydrogen-ion exponent can be determined.

According to knowledge obtained by the present inventors, it has been found that for example when the additive amount of the tungsten oxide is illustratively 2.5 wt %, if the hydrogen-ion exponent of the fluent substance as the solvent in which the tungsten oxide is dispersed is set to be larger than pH 5.7, the degree of catalytic activity drastically lowers.

Figure 2:
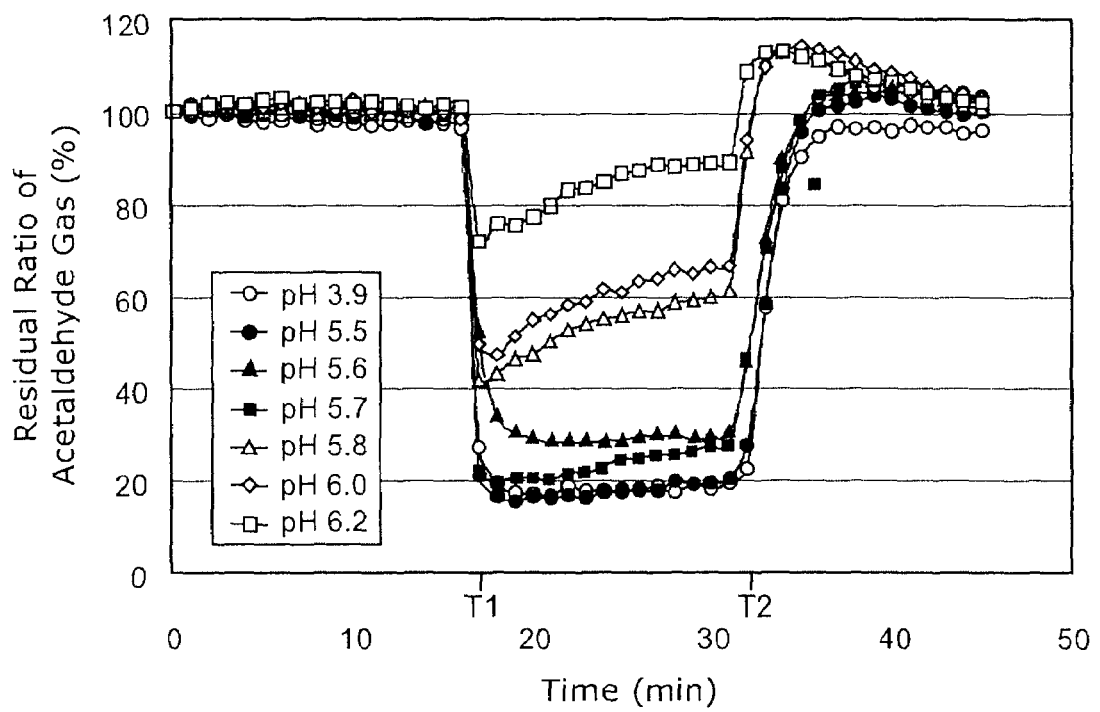
FIG. 2 shows a graph for illustrating degradation characteristics of an acetaldehyde gas.

FIGS. 1 and 2 show graphs for illustrating degradation characteristics of an acetaldehyde gas.

FIGS. 1 and 2 show graphs for illustrating characteristics in the case that the photocatalyst element is formed by attaching the photocatalyst dispersing element to the substrate surface and is irradiated with a visible light to degrade the acetaldehyde gas.

Moreover, FIG. 1 shows degradation characteristics in the cases that the hydrogen-ion exponent (pH) of the fluent substance as the solvent is near to the lower limit value, and FIG. 2 shows degradation characteristics in the cases that the hydrogen-ion exponent (pH) of the fluent substance as the solvent is near to the upper limit value.

Moreover, the vertical axis of FIGS. 1 and 2 represents a residual ratio of the acetaldehyde gas (%). That is, by irradiating the tungsten oxide with visible light, the acetaldehyde gas is degraded and the residual ratio (%) is measured.

Moreover, the horizontal axis of FIGS. 1 and 2 represents time, and at T1, the tungsten oxide is irradiated with the visible light, and at T2, the irradiation with the visible light is stopped.

As shown in FIG. 1, it is understood that when the hydrogen-ion exponent of the fluent substance is less than pH 2.1, the residual ratio of acetaldehyde is larger than 50% and the performance of the photocatalyst is adversely affected.

Moreover, as shown in FIG. 2, it is understood that when the hydrogen-ion exponent is more than 5.7, the residual ratio of acetaldehyde is larger than 50% and the performance of the photocatalyst is adversely affected.

Therefore, when tungsten oxide is used as the photocatalyst material, it is preferable that the hydrogen-ion exponent of the photocatalyst dispersing element is from pH 2.1 to pH 5.7 inclusive.

In manufacturing of photocatalyst dispersing element or the like, acid or alkali can be added for adjusting the hydrogen-ion exponent. The acid and alkali are not particularly limited, but it is preferable to select ones that are difficult to evaporate in consideration of stability or the like. For example, the acid can include sulfuric acid, and the alkali can include tetramethylammonium oxide.

Moreover, for holding the hydrogen-ion exponent of the photocatalyst dispersing element, a buffer solution can be added. The buffer solution can include an aqueous solution in which a weak acid and its salt are added. For example, a citrate buffer solution can include an aqueous solution in which citric acid and sodium citrate are added, and an acetate buffer solution can include an aqueous solution in which acetic acid and sodium acetate are added, and a phosphate buffer solution can include an aqueous solution in which phosphoric acid and sodium phosphate are added.

Moreover, according to knowledge obtained by the present inventors, when the content of the photocatalyst material is more than 20 wt %, it is feared that the dispersibility of the photocatalyst material is degraded. Therefore, it is preferable that the content of the photocatalyst material is 20 wt % or less.

Moreover, for improving dispersibility of the photocatalyst material, a dispersing agent can also be added. In this case, if an organic material is used as the dispersing agent, it is feared that the dispersing agent degrades or deteriorates by the action of the photocatalyst material, and therefore, it is preferable that an inorganic material is used. Even when the dispersing agent is added, it is necessary that at least the hydrogen-ion exponent is adjusted so as not to exceed the above upper limit value of the hydrogen-ion exponent.

Moreover, in the case of attaching the photocatalyst dispersing element to the substrate surface or the like, it is preferable that hardness of the photocatalyst film formed after drying increases to a certain extent. Here, if a large amount of hydroxyl groups (—OH) exists on a surface of tungsten oxide, tungsten oxide particles can be strongly bound to one another through oxygen groups (—O—) in drying. However, if the hydrogen-ion exponent is set to be too high for enlarging the amount of hydroxyl group (—OH), it is feared that the catalytic activity lowers as described above.

According to knowledge obtained by the present inventors, when a binding agent containing a large amount of hydroxyl groups (—OH) is further added to the surface as a so-called binder or the like, the tungsten oxide particles can be bound to one another through the binding agent in drying the fluent substance used as the solvent, and therefore, the hardness of the photocatalyst film to be formed can be enhanced. Here, the binding agent that does not degrade and deteriorate by the action of the photocatalyst is preferable. Such a binding agent can include an agent in which inorganic particles are dispersed in a solution. For example, the binding agent can include colloidal silica and colloidal alumina.

According to knowledge obtained by the present inventors, if the particle diameter of the inorganic material such as silicon oxide or alumina containing the binding agent such as so-called binder is larger than the particle diameter of the photocatalyst material, the hardness of photocatalyst film to be formed lowers. Therefore, it is preferable that the particle diameter of the photocatalyst material is equal to or less than the particle diameter of the photocatalyst material. That is, it can be said to be preferable that the size of the particle diameter of the binder used as the binding agent is equal to or less than the particle diameter of the photocatalyst material (such as tungsten oxide ($WO_3$) material).

Moreover, as the particle diameter of the inorganic material is set to be smaller, transparency of the photocatalyst film to be formed can be more enhanced. And, if the transparency can be enhanced, light can be irradiated not only to the photocatalyst material provided on the surface of the photocatalyst film but also to the photocatalyst material provided inside the photocatalyst film, and therefore, the catalyst efficiency can be enhanced.

Moreover, according to knowledge obtained by the present inventors, it is preferable that the content of the binding agent such as so-called binder is a tenth part or more of a concentration of the photocatalyst material.

Moreover, by changing additive amount of the binding agent or size of the particle diameter of the inorganic material or the like contained in the binding agent, viscosity of the photocatalyst dispersing element can be adjusted. Therefore, as described later, according to the embodiment of the photocatalyst element, viscosity of the photocatalyst dispersing element can also be appropriately determined.

Also in the case of adding the binding agent like this, it is necessary that the hydrogen-ion exponent is adjusted so that the hydrogen-ion exponent of the photocatalyst dispersing element is from pH 2.1 to pH 5.7 inclusive.

Moreover, the fluent substance as the solvent can be one evaporating at room temperature (such as water). Thereby, workability in forming the photocatalyst film on a surface of the substrate by using the photocatalyst dispersing element can be improved as described later.

Moreover, in the case of manufacturing the photocatalyst dispersing element, it is sufficient that the photocatalyst element is adjusted and the photocatalyst material is mixed, so that the hydrogen-ion exponent of the fluent substance as the solvent is in the range of inhibiting aggregation of the photocatalyst material and of suppressing lowering of the degree of catalytic activity of the photocatalyst material. Alternatively, the hydrogen-ion exponent may be adjusted after mixing the photocatalyst material with the fluent substance as the solvent.

In this case, the adjustment can be performed so that the hydrogen-ion exponent is from pH 2.5 to pH 5.7 inclusive. Moreover, the binding agent for binding the photocatalyst material can be added, and the additive amount thereof can also be 10 wt % or less.

Next, the photocatalyst element will be exemplified.

Figure 3:
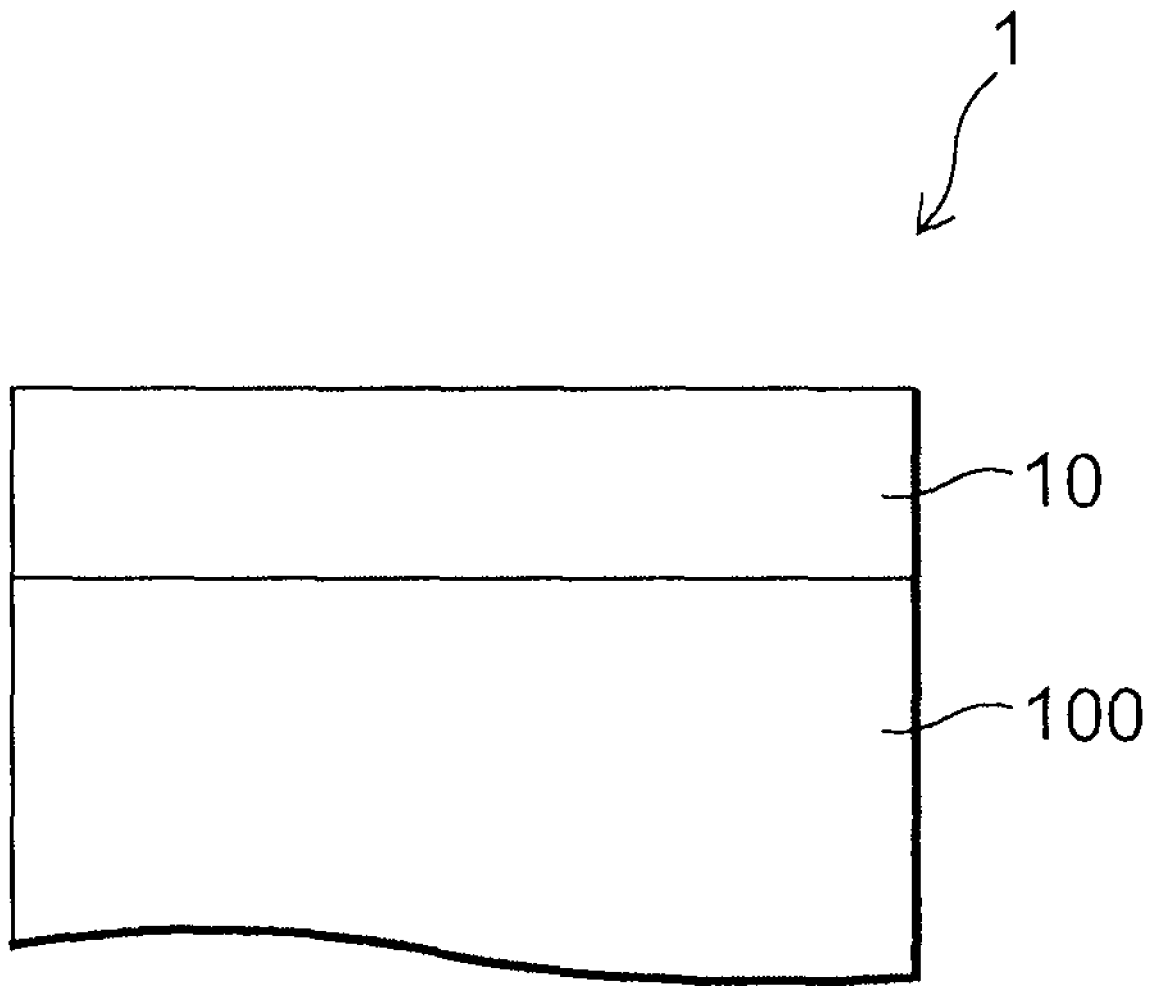
FIG. 3 is a schematic view for illustrating the cross-sectional structure of a photocatalyst element according to an embodiment of the invention.

FIG. 3 is a schematic view for illustrating the cross-sectional structure of the photocatalyst element according to the embodiment of the invention.

As shown in FIG. 3, the photocatalyst element 1 has a photocatalyst film 10 coated in a film form on a surface of the substrate 100. A material of the substrate 100 is not particularly limited but, various materials such as inorganic materials such as glass or ceramic, metal materials such as stainless steel, and organic materials such as polymer material can be used. Moreover, shape or size thereof can be appropriately determined. In the case of using an organic material such as polymer material as the substrate 100, it is feared that the substrate 100 degrades or deteriorates by the action of the photocatalyst. Therefore, in the case of using the substrate composed of the organic material, it is preferable that an intermediate layer, which is not shown, is provided between the photocatalyst film 10 and the substrate 100. The intermediate layer can includes a silicone resin layer, an acrylic-modified silicone resin layer, and an organic-inorganic complex gradient layer.

The photocatalyst film 10 can be formed by attaching the above photocatalyst dispersing element to a surface of the substrate 100 and drying the photocatalyst dispersing element. The attachment method is not particularly limited and includes a dip coating method, a spin coating method, a spray coating method, a bar coating method, a knife coating method, a roll coating method, a blade coating method, a die coating method, and a gravure coating method. Moreover, as described above, by appropriately selecting viscosity of the photocatalyst dispersing element, workability of the attachment operation can be improved. For example, it is preferable that for a place that is easily affected by disturbance such as wind or for a vertical surface, the photocatalyst dispersing element having high viscosity is used. Thereby, dripping or the like can be suppressed and therefore workability can be improved. On the other hand, when the photocatalyst dispersing element having low viscosity is used, the uniformity of the thickness of the photocatalyst film 10 can be improved.

Also, the drying method of the attached photocatalyst dispersing element is not particularly limited and, for example, natural drying (room-temperature drying), drying by heating, or the like is possible. The drying temperature can be adjusted by appropriately selecting the fluent substance as the solvent or adding an additive agent. In this case, when the fluent substance as the solvent is one evaporating at room temperature (such as water), the workability can be improved.

Use application of the photocatalyst element 1 is not particularly limited, but can be widely applied to materials in which the photocatalyst dispersing element can be attached to a surface thereof.

For example, the use application can include the case where the photocatalyst dispersing element is attached to a surface of an indoor or outdoor building material and dried and thereby the photocatalyst film 10 is formed on the surface. If the photocatalyst film 10 can be formed on the surface of the indoor or outdoor material, solar light or indoor light can be utilized and thereby harmful substances or odiferous substances in the air can be degraded and removed, or excellent functions such as antifouling, sterilization, or mildew-proof can be exerted.

In this case, when tungsten oxide is used as the photocatalyst material, the action of the photocatalyst material can also be exerted in a room in which a little ultraviolet exists. Therefore, harmful substances such as acetaldehyde and formaldehyde can also be degraded and removed by utilizing indoor light even in a room or the like, and therefore, this is beneficial for a remedy against sick house syndrome.

The application example of the photocatalyst element 1 can include wallpaper, a curtain, a carpet, a ceiling material, a floor material, window glass, a mirror, tile, a sanitary material, furniture, a lighting apparatus, filter parts of air-conditioning equipment and deodorizing device, home electric appliances, a packaging material, and a recording medium of information.

Moreover, the invention can be applied to a member constituting the outer surface of a building. For example, the invention can be applied to a building material constituting a wall surface of the building (such as chalk wall, cement hardening board, concrete board, or woody fiberboard).

Moreover, the invention can also be applied to internal and external wall surfaces or internal and external accessories of a transport machine such as automobile, train, airplane, or ship, and to packaging container or the like of food item or the like.

As described above, the embodiments of the invention has been exemplified. However, the invention is not limited to these descriptions.

The above embodiments appropriately modified by those skilled in the art are included in the scope of the invention as long as having the characteristics of the invention.

Moreover, each of the components of each of the above embodiments can be combined in the possible range, and the combination thereof is also included in the scope of the invention as long as including the characteristics of the invention.

The invention claimed is:

1. A method for manufacturing a photocatalyst dispersing element, comprising:

adjusting a hydrogen-ion exponent in a solvent by adding a buffer to be in a range of pH 2.1 to 5.7 of inhibiting aggregation of a photocatalyst material and of suppressing lowering of a degree of catalytic activity of the photocatalyst material which is tungsten oxide; and mixing the photocatalyst material with the solvent.

2. The method according to claim 1, wherein a binding agent for binding the photocatalyst material is added.

3. The method according to claim 1, wherein an additive amount of the binding agent is a tenth part or more of a concentration of the photocatalyst material.

4. A method for manufacturing a photocatalyst dispersing element, comprising:

mixing a photocatalyst material with a solvent; and adjusting a hydrogen-ion exponent in the solvent by adding a buffer to be in a range of pH 2.1 to 5.7 of inhibiting aggregation of the photocatalyst material and of suppressing lowering of a degree of catalytic activity of the photocatalyst material, wherein the photocatalyst material is tungsten oxide.

5. The method according to claim 4, wherein a binding agent for binding the photocatalyst material is added.

6. The method according to claim 4, wherein an additive amount of the binding agent is a tenth part or more of a concentration of the photocatalyst material.

* * * * *